US012780691B2

(12) United States Patent
Tsutano et al.

(10) Patent No.: US 12,780,691 B2
(45) Date of Patent: Nov. 3, 2026

(54) ULTRAPURE WATER SUPPLY SYSTEM, CONTROL DEVICE, AND PROGRAM

(71) Applicant: ORGANO CORPORATION, Tokyo (JP)

(72) Inventors: Kyohei Tsutano, Tokyo (JP); Satoshi Nakai, Tokyo (JP); Hiroshi Sugawara, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 727 days.

(21) Appl. No.: 18/025,978

(22) PCT Filed: Aug. 23, 2021

(86) PCT No.: PCT/JP2021/030749
§ 371 (c)(1),
(2) Date: Mar. 13, 2023

(87) PCT Pub. No.: WO2022/059430
PCT Pub. Date: Mar. 24, 2022

(65) Prior Publication Data

US 2023/0365436 A1 Nov. 16, 2023

(30) Foreign Application Priority Data

Sep. 15, 2020 (JP) ................................. 2020-154530

(51) Int. Cl.
*C02F 1/42* (2023.01)
*C02F 1/00* (2023.01)
*C02F 103/04* (2006.01)

(52) U.S. Cl.
CPC ................ *C02F 1/42* (2013.01); *C02F 1/004* (2013.01); *C02F 2103/04* (2013.01);
(Continued)

(58) Field of Classification Search
CPC .. C02F 1/001; C02F 9/00; C02F 1/008; C02F 2209/005; C02F 2209/105; C02F 1/42;
(Continued)

(56) References Cited

U.S. PATENT DOCUMENTS 10,138,149 B2 11/2018 Yokoi et al.
2005/0016929 A1 * 1/2005 Kashkoush .............. C02F 9/20 210/96.1

(Continued)

FOREIGN PATENT DOCUMENTS

CN 1526649 A * 9/2004 ............... C02F 1/00
CN 1876977 A 12/2006

(Continued)

OTHER PUBLICATIONS

Machine generated English language translation of JP 2004122020 A (Year: 2004).*

(Continued)

*Primary Examiner* — Benjamin L Lebron
*Assistant Examiner* — Bernadette Karen McGann
(74) *Attorney, Agent, or Firm* — GREENBLUM & BERNSTEIN, P.L.C.

(57) ABSTRACT

Distribution pipe for conducting ultrapure water from ultrapure water production facility to cleaning apparatus treatment unit provided on distribution pipe, distribution pipe for conducting ultrapure water to cleaning apparatus branches from distribution pipe between ultrapure water production facility and treatment unit, water amount controller provided in a first branch portion where distribution pipe branches from distribution pipe, water amount controller for controlling the ultrapure water supplied from distribution pipe to cleaning apparatus comparator for comparing a first amount of impurities contained in the ultrapure water treated by treatment unit with a second amount of impurities contained (Continued)

in the non-treated ultrapure water by treatment unit and flow path controller for controlling water amount controllers based on the results of the comparison.

8 Claims, 10 Drawing Sheets

(52) U.S. Cl.
CPC .. *C02F 2201/005* (2013.01); *C02F 2209/003* (2013.01); *C02F 2209/006* (2013.01); *C02F 2209/40* (2013.01)

(58) Field of Classification Search
CPC ............ C02F 2103/04; C02F 2201/005; C02F 2209/003; C02F 2201/002; C02F 2209/001; C02F 2303/14
See application file for complete search history.

(56) References Cited

U.S. PATENT DOCUMENTS

| | | | | |
|---|---|---|---|---|
| 2008/0116908 | A1* | 5/2008 | Potyrailo | G21C 17/022 324/721 |
| 2013/0328579 | A1* | 12/2013 | Whitehead | C02F 1/42 324/693 |
| 2016/0159672 | A1 | 6/2016 | Yokoi et al. | |

FOREIGN PATENT DOCUMENTS

| | | | | | |
|---|---|---|---|---|---|
| CN | 101376554 | A | | 3/2009 | |
| CN | 102989711 | A | | 3/2013 | |
| CN | 103432818 | A | | 12/2013 | |
| CN | 204008623 | U | | 12/2014 | |
| CN | 106698540 | A | | 5/2017 | |
| CN | 108031291 | A | | 5/2018 | |
| JP | 2004122020 | A | * | 4/2004 | |
| JP | 2011-161418 | A1 | | 8/2011 | |
| JP | 2014-217830 | A1 | | 11/2014 | |
| KR | 10-2027026 | B1 | | 9/2019 | |
| TW | 201938965 | A | | 10/2019 | |
| WO | WO-2012073594 | A1 | * | 6/2012 | G01N 1/2214 |
| WO | WO-2019188963 | A1 | * | 10/2019 | B01D 61/18 |
| WO | WO-2020080461 | A1 | * | 4/2020 | C02F 1/42 |

OTHER PUBLICATIONS

Machine generated English language translation of CN 1526649 A (Year: 2004).*
Machine generated English language translation of WO 2020080461 A1 (Year: 2020).*
Machine generated English language translation of WO 2019188963 A1 (Year: 2019).*
Notice of Reasons for Refusal Dated Sep. 10, 2024 in Japanese family member application No. 2023-176053 with English language translation thereof.
Office Action dated Jan. 22, 2025 in Chinese family member application No.202180055028.3. . Note: This document is being submitted for its citation/characterization of the above documents as Category "Y", etc. (see pp. 8, 9), and the Examiner's consideration is respectfully requested on that basis.
Office Action, dated Oct. 28, 2024, in Taiwanese family member Patent Application No. 110131979, with English language translation thereof.
Written Decision on Registration issued in Korean Patent Application No. 20237006197, dated Apr. 29, 2026, together with an English-language translation.

* cited by examiner

FIG.4

| Concentration | Valve 610 | Valve 620 | Valve 630 | Valve 640 |
|---|---|---|---|---|
| P410 < P420 | Open | Open | Open | Close |
| P410 = P420 | Close | Open | Close | Open |

ULTRAPURE WATER SUPPLY SYSTEM, CONTROL DEVICE, AND PROGRAM

TECHNICAL FIELD

The present invention relates to an ultrapure water supply system, a control device, and a program.

BACKGROUND OF ART

Generally, the quality of ultrapure water supplied from an ultrapure water production facility to a point of use (e.g., where ultrapure water is used in a semiconductor cleaning device) meets prescribed standards. However, due to elution or the like of ionic metal impurities from the supply pipes, the water quality of ultrapure water supplied from the ultrapure water production facility to the point of use will not meet the standards in some cases. In preparation for such a case, a technique has been considered for installing a treatment unit for removing impurities contained in the ultrapure water between the ultrapure water production facility and the point of use (e.g., see Patent Document 1).

PRIOR ART DOCUMENTS

Patent Documents

Patent Document 1: International Publication No. 2015/045975

SUMMARY OF THE INVENTION

Problem to be Solved by the Invention

In Cited Document 1, even when the quality of ultrapure water supplied from an ultrapure water production facility to a point of use satisfies a predetermined standard, the water that has been supplied from the ultrapure water production facility is treated by a treatment unit before being supplied to the point of use. Therefore, there is a problem that the system for supplying ultrapure water cannot be efficiently used.

It is an object of the present invention to provide an ultrapure water supply system, a control device, and a program capable of efficiently utilizing a system for supplying ultrapure water.

Means for Solving the Problem

The present invention is an ultrapure water supply system, comprising:

- a first distribution pipe that conducts ultrapure water from an ultrapure water production facility to a cleaning apparatus;
- a treatment unit that is installed on the first distribution pipe and that treats the ultrapure water;
- a second distribution pipe that branches from the first distribution pipe between the ultrapure water production facility and the treatment unit and that conducts the ultrapure water to the cleaning apparatus;
- a first water amount controller that is provided at a first branch portion at which the second distribution pipe branches from the first distribution pipe;
- a second water amount controller that controls the ultrapure water that flows from the second distribution pipe to the cleaning apparatus;

- a comparator that compares a first amount that is the amount of impurities contained in ultrapure water that has been treated by the treatment unit with a second amount that is the amount of impurities contained in ultrapure water that has not been treated by the treatment unit; and
- a flow path controller that controls the first water amount controller and the second water amount controller based on the result of comparison in the comparator.

Further, the present invention is a control device, comprising:

- a first water amount controller that is provided at a first branch portion at which, from a first distribution pipe that conducts ultrapure water from an ultrapure water production facility to a cleaning apparatus, a second distribution pipe that conducts the ultrapure water to the cleaning apparatus branches between the ultrapure water production facility and a treatment unit that is installed on the first distribution pipe for processing the ultrapure water;
- a second water amount controller that controls ultrapure water flowing from the second distribution pipe to the cleaning apparatus;
- a comparator that compares a first amount that is the amount of impurities contained in the ultrapure water at a first point that has passed through the treatment unit with a second amount that is the amount of impurities contained in ultrapure water that has flowed from the ultrapure water production facility and that has not been treated by the treatment unit; and
- a flow path controller that controls the first water amount controller and the second water amount controller based on the result of comparison in the comparator.

Further, the present invention is a program for causing a computer to execute procedures, the procedures comprising:

- a procedure for comparing a first amount that is the amount of impurities contained in the ultrapure water at a first point that has passed through a treatment unit for treating the ultrapure water provided on a first distribution pipe that conducts ultrapure water from an ultrapure water production facility to a cleaning apparatus with a second amount that is the amount of impurities contained in ultrapure water that has flowed from the ultrapure water production facility and has not been treated by the treatment unit; and
- a procedure for controlling ultrapure water that flows to the first distribution pipe and ultrapure water that flows to the second distribution pipe based on the result of comparison.

Advantageous Effects of the Invention

In the present invention, it is possible to efficiently utilize a system for supplying ultrapure water.

BRIEF DESCRIPTION OF THE DRAWINGS

FIG. 4 is a diagram showing an example of a control method of a valve operated by the flow path controller shown in FIG. 1.

DESCRIPTION OF THE EMBODIMENTS

Embodiments of the present invention will next be described with reference to the accompanying drawings.

First Embodiment

Figure 1:
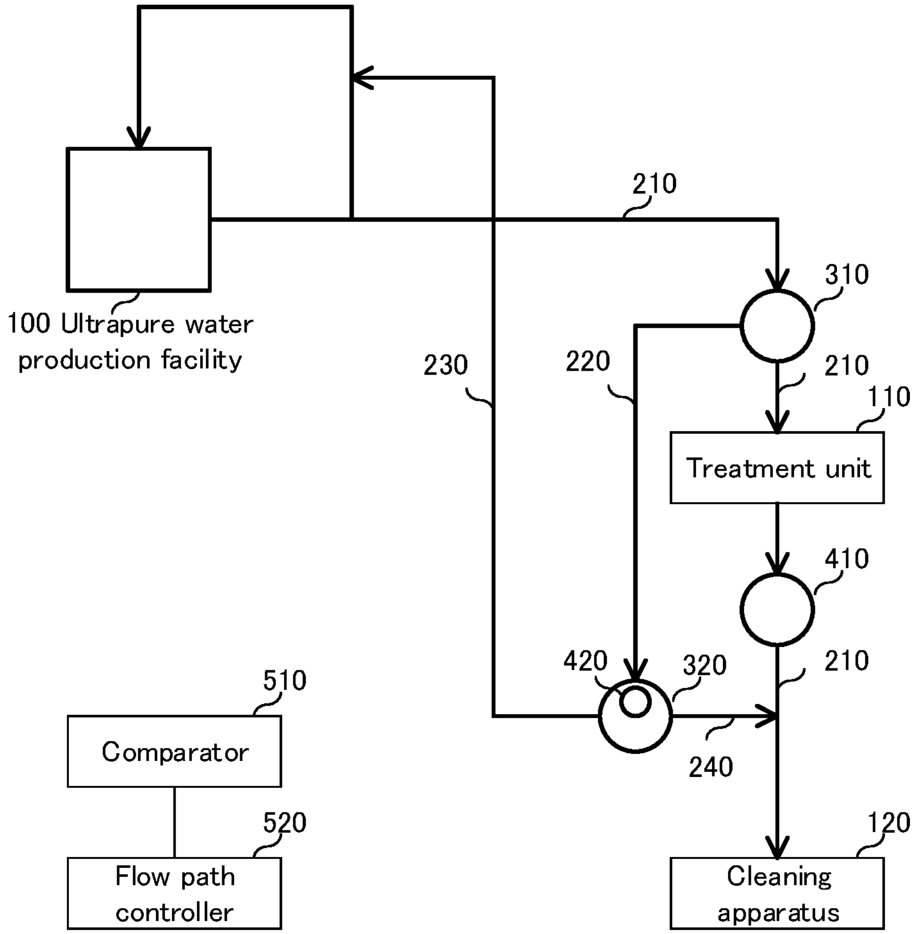
FIG. 1 is a diagram showing a first embodiment of the ultrapure water supply system of the present invention.

FIG. 1 is a diagram showing a first embodiment of the ultrapure water supply system of the present invention. As shown in FIG. 1, the ultrapure water supply system of this embodiment has treatment unit 110, distribution pipes 210, 220, 230, and 240, water amount controllers 310 and 320, measuring units 410 and 420, comparator 510, and flow path controller 520.

Treatment unit 110 is a device installed on distribution pipe 210 that conducts ultrapure water from ultrapure water production facility 100 to the point of use (in the present embodiment, cleaning apparatus 120 for cleaning an object). This ultrapure water is water used in, for example, semiconductor device manufacturing plants. Treatment unit 110 is a unit for removing impurities from ultrapure water flowing in distribution pipe 210. Treatment unit 110 removes impurities from ultrapure water using, for example, an ion exchanger, a microfiltration membrane (MF), an ultrafiltration membrane (UF), or the like. This ion exchanger has an ion removal or ion adsorption function (e.g., an ion adsorption membrane, a monolith, or an ion exchange resin). The objects to be removed or adsorbed by the ion exchanger are ionic metal impurities. In addition, the ion exchanger also adsorbs fine particles by an electrostatic effect. Treatment unit 110 has a structure that assumes the amount (first amount) of impurities of the ultrapure water that is to be treated to be, in terms of concentration, a value lower than, for example, 1 ppt. Treatment unit 110 may have a filter or the like that is used alone for removing these impurities. Alternatively, treatment unit 110 may have a combination of filters or the like that are used for removing these impurities. Within treatment unit 110, the constituent filters or the like may have a redundant configuration so as to be replaceable. Further, a pressure-boosting pump and heat exchanger may be provided upstream of treatment unit 110.

Examples of components to be placed in treatment unit 110 include an ion exchanger, a microfiltration membrane (MF), and an ultrafiltration membrane (UF.) Each of these components may be used alone, or may be used in any combination.

Specific examples of the configuration of treatment unit 110 include:

- an anion monolith,
- a cation monolith, or
- a combination of anion and cation monoliths.

Here, a monolithic organic porous body is referred to as a monolith. In addition, an ion exchange resin, a combination of an ion exchange resin and a microfiltration membrane (MF), an ion adsorption membrane, a combination of an ion adsorption membrane and a microfiltration membrane (MF), or a combination of a plurality of microfiltration membranes (MF) may be provided upstream or downstream of these monoliths. Furthermore, the configuration of treatment unit 110 may be:

- an anion exchange resin,
- a cation exchange resin, or
- a combination of an anion exchange resin and a cation exchange resin (laminated or mixed bed).

In addition, an ion adsorption membrane, a combination of an ion adsorption membrane and a microfiltration membrane (MF), or a combination of a plurality of microfiltration membranes (MF) may be provided upstream or downstream of these resins. Furthermore, the configuration of treatment unit 110 may be:

- ion adsorption membrane,
- a combination of an ion adsorption membrane and a microfiltration membrane (MF),
- a microfiltration membrane (MF), and
- an ultrafiltration membrane (UF).

In addition, a combination of the above-described monoliths and an ion exchange resin, or a combination of a monolith and an ion adsorption membrane may be used.

Ultrapure water production facility 100 is a facility for producing ultrapure water for supply to cleaning apparatus 120. The configuration for producing ultrapure water may be a common one. Ultrapure water production facility 100 is provided with, for example, a pretreatment system, a primary pure water system, and a secondary pure water system (subsystem). The primary pure water system is a system installed downstream from the pretreatment system. The secondary pure water system (subsystem) is a system installed downstream from the primary pure water system. Ultrapure water is generally produced by sequential treatment of raw water (river water, groundwater, industrial water, etc.) by a pretreatment system, a primary pure water system and a secondary pure water system. In the secondary pure water system, for example, a primary pure water tank in which pure water produced in the primary pure water system is stored, a heat exchanger (HE), an ultraviolet oxidizer (UVox), a non-regenerative type ion exchange device (CP: Cartridge Polisher), a membrane degassifier (MD) for removing dissolved gas, and an ultrafiltration device (UF: UltraFiltration membrane) are provided in that order. Pure water is supplied from the primary pure water tank using a pump and is sequentially treated to produce ultrapure water.

Cleaning apparatus 120 is an apparatus that uses the supplied ultrapure water to clean a wafer or a glass substrate, a printed circuit board, a metal substrate, and the like.

Distribution pipe 210 is a first distribution pipe for conducting ultrapure water from ultrapure water production facility 100 to cleaning apparatus 120. Distribution pipe 220 is a second distribution pipe that branches from distribution pipe 210 between ultrapure water production facility 100 and treatment unit 110 and that conducts ultrapure water to cleaning apparatus 120 (strictly speaking, ultrapure water flows to cleaning apparatus 120 through distribution pipe 240 to be described later). Distribution pipe 230 is a third distribution pipe for returning the ultrapure water from distribution pipe 220 to ultrapure water production facility 100. Incidentally, distribution pipe 230 may be for conducting ultrapure water from distribution pipe 220 to a drainage tank and a recovery tank (not shown.) Distribution pipe 240 is a fourth distribution pipe for conducting ultrapure water from distribution pipe 220 to cleaning apparatus 120. The branch point where distribution pipe 220 branches from distribution pipe 210 is the first branch portion. Further, the branch point where distribution pipe 220 branches to distribution pipe 230 and distribution pipe 240 is the second branch portion. Water amount controller 310 is a first water amount controller provided at the first branch portion. Water amount controller 320 is a second water amount controller provided at the second branch portion. Measuring unit 410 for controlling the flow rate of ultrapure water flowing from distribution pipe 220 to cleaning apparatus 120 is a first measuring unit for measuring a first amount of impurities at the first point (first quantity measuring point) of ultrapure water treated by treatment unit 110. Measuring unit 420 is a second measuring unit for measuring a second amount of impurities at the second point on distribution pipe 220. Measuring unit 420 may be arranged at a position capable of measuring a second amount which is the amount of impurities contained in ultrapure water not treated by treatment unit 110. For example, measuring unit 420 may be provided on distribution pipe 210. Alternatively, measuring unit 420 may be provided on distribution pipe 220 as shown in FIG. 1. Incidentally, distribution pipe 240 joins with distribution pipe 210 between the first point and cleaning apparatus 120.

Figure 2:
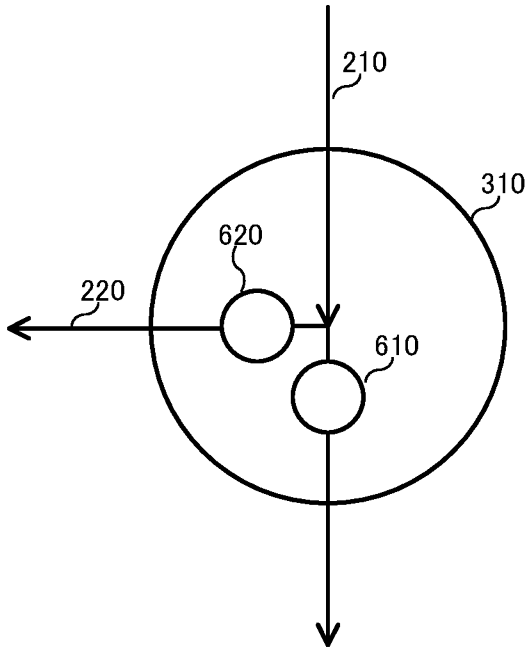
FIG. 2 is a diagram showing an example of the internal configuration of the first water amount controller shown in FIG. 1.

FIG. 2 is a diagram showing an example of the internal configuration of water amount controller 310 shown in FIG. 1. As shown in FIG. 2, water amount controller 310 shown in FIG. 1 has valve 610 and valve 620. Valve 610 is a first valve (shutoff valve) for adjusting the amount of water flowing into treatment unit 110. Valve 620 is a second valve (shutoff valve) for adjusting the amount of water flowing into distribution pipe 220.

Figure 3:
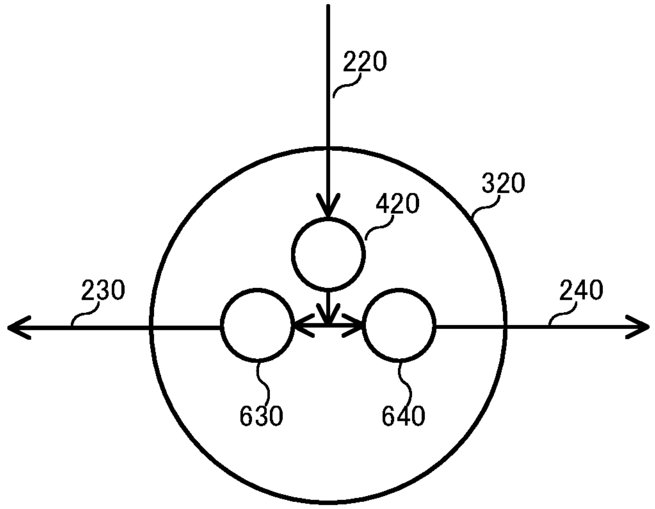
FIG. 3 is a diagram showing an example of the internal configuration of the second water amount controller shown in FIG. 1.

FIG. 3 is a diagram showing an example of the internal configuration of water amount controller 320 shown in FIG. 1. As shown in FIG. 3, water amount controller 320 shown in FIG. 1 has measuring unit 420, valve 630, and valve 640. Valve 630 is a third valve (shutoff valve) for adjusting the amount of water flowing from distribution pipe 220 to distribution pipe 230. Valve 640 is a fourth valve (shutoff valve) for adjusting the amount of water flowing from distribution pipe 220 to distribution pipe 240.

Measuring units 410 and 420 each include a filtration type sampling mechanism for capturing impurities. This filtration type sampling mechanism contains an ion exchanger. The ion exchanger in this case may be any material having an ion exchange function. This ion exchanger is preferably a monolithic ion exchanger. Further, the objects captured by measuring units 410 and 420 may be fine particles having a diameter of 10 nm or more. Further, the filtration type sampling mechanism that is provided in each of measuring units 410 and 420 for capturing impurities includes a filtration membrane and a centrifugal filtration membrane capable of capturing fine particles having a diameter of 10 nm or more. In this case, the filtration membrane capable of capturing fine particles having a diameter of 10 nm or more is an AAO (Anodic Aluminum Oxide) membrane.

The analysis method and analysis evaluation of impurities in measuring units 410 and 420 is next described. The ionic metal impurity analysis of ultrapure water in measuring units 410 and 420 preferably uses the concentration method disclosed in JP-A 2001-153855. In this method, specifically, ultrapure water produced by ultrapure water production facility 100 is passed through an ion exchanger provided in measuring units 410 and 420 to cause the ion exchanger to capture ionic impurities contained in the ultrapure water. An eluent is then passed through the ion exchanger that has captured the ionic impurities contained in the ultrapure water. In this method, the eluent elutes the ionic impurities contained in the ultrapure water from the ion exchanger, the recovery eluent is acquired, and the concentrations of each ionic impurity in the recovery eluent are then measured. It is possible to measure metals of 0.1 ng/L or less by using the concentration method.

The analysis method and analysis evaluation of impurities in these measuring units 410 and 420 employs a concentration method that uses a monolith ion exchanger as an ion exchanger. Examples of the structure of the monolithic ion exchanger used here include open cell structures disclosed in JP-A-2002-306976 and JP-A-2009-62512, common continuous structures disclosed in JP-A-2009-67982, particle aggregation structures disclosed in JP-A-2009-7550, and particle composite structures disclosed in JP-A-2009-108294. Further, examples of the structure, material, and properties of the ion exchanger include those disclosed in JP-A 2019-195763. Examples include the ion exchange group introduced into the monolithic ion exchanger, the cation exchange group introduced into the monolithic organic porous cation exchanger (hereinafter, referred to as the monolithic cation exchanger), and the anion exchange group introduced into the monolithic organic porous anion exchanger (hereinafter, referred to as the monolithic anion exchanger) as disclosed in JP-A-2019-195763.

Further, as the fine particle analysis of ultrapure water in measuring units 410 and 420, a direct inspection method is preferably used in which particles captured by membrane filtration are observed using an SEM (Scanning Electron Microscope.) Generally, analysis is carried out using a liquid particle counter. However, in analysis using a liquid particle counter, only particles larger than 20 nm can be detected, and the detection efficiency is therefore low. Using the direct inspection method enables analysis of the composition of fine particles, thus allowing identification of the source of the fine particles. The filtration type sampling mechanism installed in measuring units 410 and 420 for analyzing and evaluating the water quality of ultrapure water need not be continuously installed. The filtration-type sampling mechanism installed in measuring units 410 and 420 is preferably one that allows sampling at any timing or at periodic timing. The part (e.g., kit, module, holder, etc.; hereinafter, referred to as a sample) that has captured (concentrated) impurities in the filtration-type sampling mechanism installed in measuring units 410 and 420 is preferably detachable from measuring units 410 and 420. Further, a sample in which impurities have been captured (concentrated) and that has been removed from measuring units 410 and 420 is subjected to analysis while avoiding contamination. Samples that have been sampled by measuring units 410 and 420 and then removed from measuring units 410 and 420 are not necessarily analyzed with each sampling. The samples removed from measuring units 410 and 420 may be stored while avoiding contamination and then analyzed together or only partially as necessary.

Comparator 510 compares the first amount measured by measuring unit 410 and the second amount measured by measuring unit 420. For example, comparator 510 may compare a value in which the first amount measured by measuring unit 410 is converted into a concentration (hereinafter, referred to as the first concentration) and a value in which the second amount measured by measuring unit 420 is converted into a concentration (hereinafter, referred to as the second concentration.) Flow path controller 520, based on the result of comparison in comparator 510, controls water amount controller 310 and water amount controller 320. Specifically, flow path controller 520 controls the opening and closing of each of valves 610, 620, 630, and 640 based on the result of comparison in comparator 510. More specifically, flow path controller 520 places valves 610, 620, and 630 in the open state and places valve 640 in the closed state when the first amount is less than the second amount. Flow control unit 520 otherwise places valves 610 and 630 in the closed state and places valves 620 and 640 in the open state.

FIG. 4 is a diagram showing an example of the control method of valves 610, 620, 630, and 640 performed by flow path controller 520 shown in FIG. 1. The example shown in FIG. 4 is an example in which correspondences are used when comparator 510 compares the first concentration and the second concentration. As shown in FIG. 4, flow path controller 520 associates the magnitude relationship between the first concentration into which the first amount measured by measuring unit 410 is converted and the second concentration into which the second amount measured by measuring unit 420 and the control content for opening and closing valves 610, 620, 630, and 640 are associated each other. Flow control unit 520 refers to the result of comparison in comparator 510 and this association to control the opening and closing of each of valves 610, 620, 630, and 640. For example, when the result of comparison in comparator 510 is transmitted to flow path controller 520 and the first concentration is lower than the second concentration, flow path controller 520 controls valves 610, 620, 630, and 640 by the method that is associated with a case in which the first concentration is lower than the second concentration in these associations. In the example shown in FIG. 4, flow path controller 520 in this case places valve 610, valve 620, and valve 630 in the open state, and places valve 640 in the closed state. When the result of comparison in comparator 510 is transmitted to flow path controller 520 and the first concentration and the second concentration are equal, flow path controller 520 controls valves 610, 620, 630, and 640 by the method that is associated with a case in which the first concentration and the second concentration are equal in these associations. In the example shown in FIG. 4, flow path controller 520 in this case places valve 610 and valve 630 in the closed state and places valve 620 and valve 640 in the open state. These associations may be stored in flow path controller 520. Alternatively, these associations may be stored in an external storage medium that can be accessed by flow path controller 520.

In addition, the result of this comparison may have a certain margin. For example, when the associations shown in FIG. 4 are used, when the concentration measured by measuring unit 410 changes from a state in which the concentration is lower than the concentration measured by measuring unit 420 to a state in which the concentration is equal to the concentration measured by measuring unit 420, flow path controller 520 places valves 610 and 630 in the closed state and places valves 620 and 640 in the open state. For example, when the concentration measured by measuring unit 410 changes from a state in which the concentration is lower than the concentration measured by measuring unit 420 to a state in which the concentration is nearly equal to the value of the concentration measured by measuring unit 420, flow path controller 520 may place valves 610 and 630 in the closed state and place valves 620 and 640 in the open state. A margin of this type may be set in advance or may be calculated based on the concentrations. With such a margin, for example, when the first concentration measured by measuring unit 410 is lower than the second concentration measured by measuring unit 420, and moreover, the difference between the first concentration and the second concentration is equal to or greater than a predetermined value (margin value), flow path controller 520 places valves 610, 620, and 630 in the open state and places valve 640 in the closed state. Flow path controller 520 otherwise places valves 610 and 630 in the closed state and places valves 620 and 640 in the open state.

Figure 5:
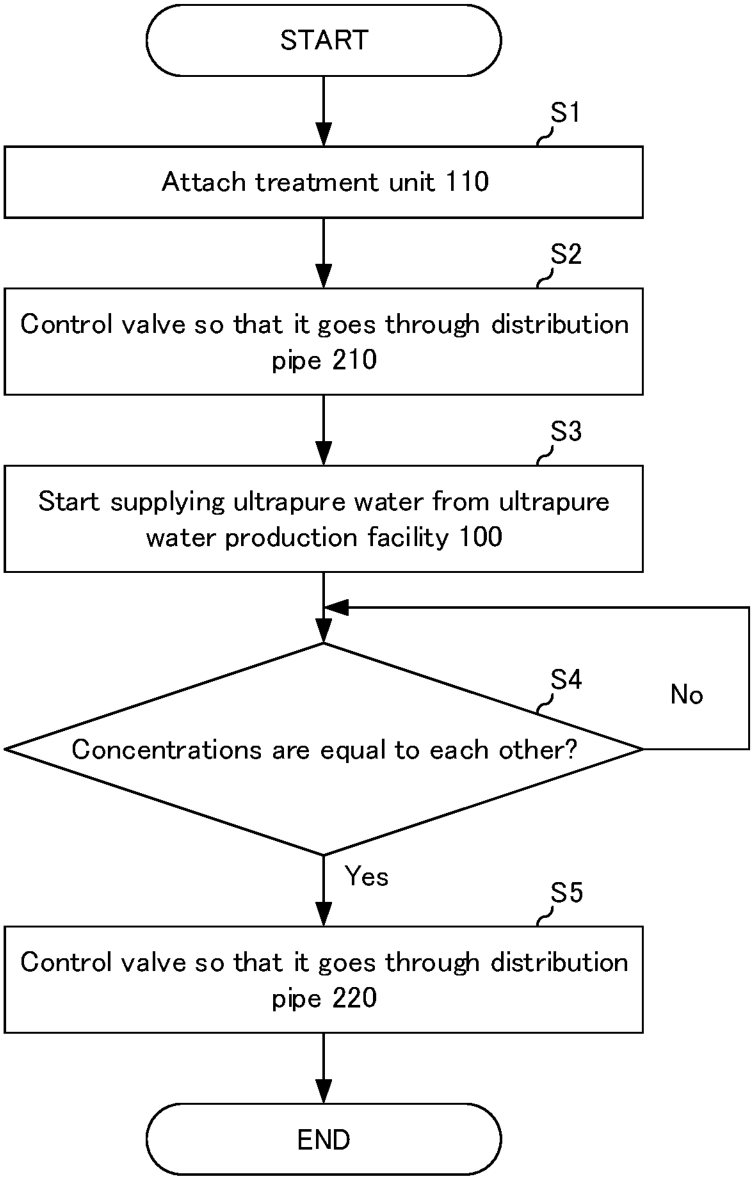
FIG. 5 is a flowchart for explaining an example of an ultrapure water supply method in the ultrapure water supply system shown in FIG. 1.

The ultrapure water supply method in the ultrapure water supply system shown in FIG. 1 will be described below. FIG. 5 is a flowchart for explaining an example of an ultrapure water supply method in the ultrapure water supply system shown in FIG. 1. Here, the process in a case in which comparator 510 compares the first concentration and the second concentration will be described as an example. First, treatment unit 110 is attached to distribution pipe 210 (Step S1). Thereafter, flow path controller 520 controls the opening and closing of valves 610, 620, 630, and 640 such that ultrapure water supplied from ultrapure water production facility 100 can flow to cleaning apparatus 120 through distribution pipe 210 and treatment unit 110 (Step S2.) At this time, flow path controller 520 controls the opening and closing of valves 610, 620, 630, and 640 such that ultrapure water supplied from ultrapure water production facility 100 can also flow to measuring unit 420. Specifically, flow path controller 520 places valves 610, 620, and 630 in the open state and places valve 640 in the closed state. Ultrapure water production facility 100 next starts supplying ultrapure water (Step S3.) Thereafter, comparator 510 compares the measurement result (e.g., the concentration of impurities or the number of fine particles) in measuring unit 410 with the measurement result (the concentration of impurities) in measuring unit 420. Flow path controller 520 determines whether or not the measured concentrations of impurities are equal to each other based on the results of the comparison in comparator 510 (Step S4.) If the concentrations of impurities measured in each of measuring units 410 and 420 are equal to each other, flow path controller 520 controls the opening and closing of valves 610, 620, 630, and 640 such that the ultrapure water supplied from ultrapure water production facility 100 can flow to cleaning apparatus 120 through distribution pipe 220 (Step S5.) Specifically, flow path controller 520 closes valves 610 and 630 and opens valves 620 and 640.

Under the above-described control of the opening and closing of valves 610, 620, 630, and 640 by flow path controller 520, ultrapure water from ultrapure water production facility 100 is supplied to cleaning apparatus 120 by way of treatment unit 110 if the concentration of impurities of the ultrapure water flowing from ultrapure water production facility 100 is higher than a specified value such as immediately after the start-up of ultrapure water production facility 100, following which the ultrapure water from ultrapure water production facility 100 is supplied to cleaning apparatus 120 without passing through treatment unit 110 if the concentration of impurities of the ultrapure water flowing from ultrapure water production facility 100 falls to or below a specified value. If, after ultrapure water from ultrapure water production facility 100 is supplied to cleaning apparatus 120 without passing through treatment unit 110, the concentration of impurities contained in the ultrapure water flowing from ultrapure water production facility 100 should again become higher than the specified value, the ultrapure water from ultrapure water production facility 100 may again be supplied to cleaning apparatus 120 by way of treatment unit 110. When control is implemented to supply ultrapure water from ultrapure water production facility 100 to cleaning apparatus 120 without passing through treatment unit 110, ultrapure water does not flow to treatment unit 110. As a result, treatment unit 110 can be removed from distribution pipe 210. When treatment unit 110 is removed from distribution pipe 210, flow path controller 520 may place valves 610 and 630 in the closed state and valves 620 and 640 in the open state. Flow path controller 520 may further place valves 610, 620, and 640 in the open state and valve 630 in the closed state.

Flow path controller 520 controls the opening and closing of valves 610, 620, 630, and 640 at the timing at which the inflow and shutoff of ultrapure water to the desired distribution pipe can be switched. For example, when the path for conducting ultrapure water to cleaning apparatus 120 is switched from distribution pipe 210 to the path through distribution pipes 220 and 240, flow path controller 520 places valves 620 and 640 in the open state at the same timing as the timing for closing valves 610 and 630. These same timings are preferably perfectly matched to each other. Even if not perfectly matched with each other, the difference between these timings may be within a predetermined range. The same applies to the timing of closing valve 610 and the timing of closing valve 630. The same applies to the timing of opening valve 620 and the timing of opening valve 640. For example, flow path controller 520 may place valves 620 and 640 in the open state within a predetermined time after placing valves 610 and 630 in the closed state.

Water amount controllers 310 and 320, valves 610, 620, 630, and 640, comparator 510, and flow path controller 520 described above constitute a control device.

Figure 6:
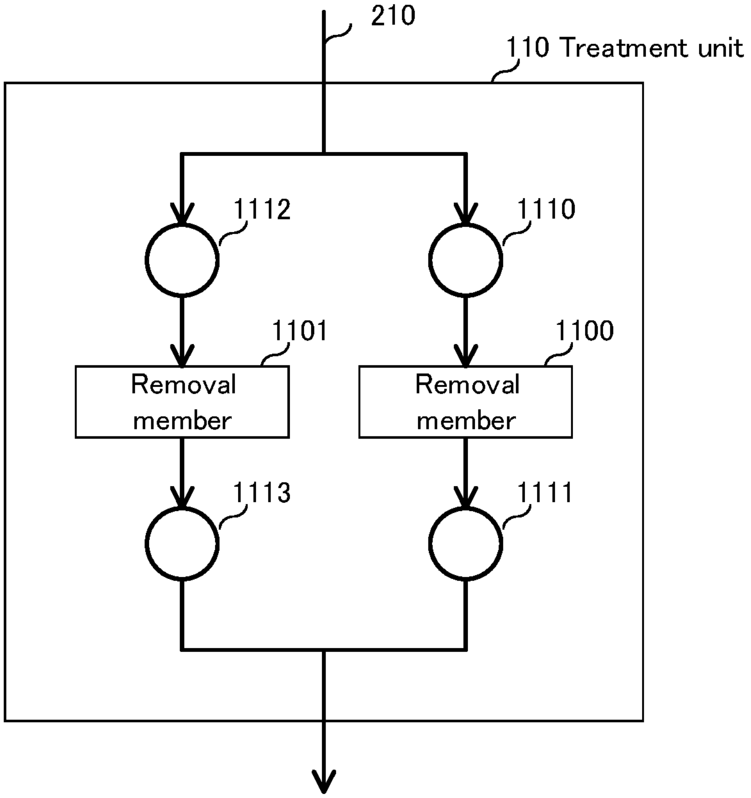
FIG. 6 is a diagram showing a first example of the internal configuration of the treatment unit shown in FIG. 1.

An example of the internal configuration of treatment unit 110 shown in FIG. 1 is next described. FIG. 6 is a diagram showing a first example of the internal configuration of treatment unit 110 shown in FIG. 1. In the example shown in FIG. 6, treatment unit 110 shown in FIG. 1 includes two removal members 1100 and 1101 and four valves 1110 to 1113. Removal member 1100 and valves 1110 and 1111 are connected in a series in the order of valve 1110, removal member 1100, and valve 1111 from upstream, and removal member 1101 and valves 1112 and 1113 are connected in a series in the order of valve 1112, removal member 1101, and valve 1113 from upstream, these two series being connected to each other in parallel. Valves 1110 to 1113 are sixth valves that are controlled such that ultrapure water flowing in from distribution pipe 210 flows into one or the other of two removal members 1100 and 1101. Flow path controller 520 controls the opening and closing of valves 1110 to 1113 based on the result of the comparison between the first amount and the second amount in comparator 510. At this time, when the first amount is smaller than the second amount but approaches the second amount (for example, when the first amount is a value obtained by subtracting a predetermined value from the second amount), flow path controller 520 controls the opening and closing of valves 1110 to 1113 so as to switch the removal member through which the ultrapure water flows to the other removal member. Further, a value smaller than the second amount is set in advance as a permissible amount, and when the first amount becomes the permissible amount, flow path controller 520 may control the opening and closing of valves 1110 to 1113 so as to switch the removal member through which the ultrapure water flows to the other removal member.

Figure 7:
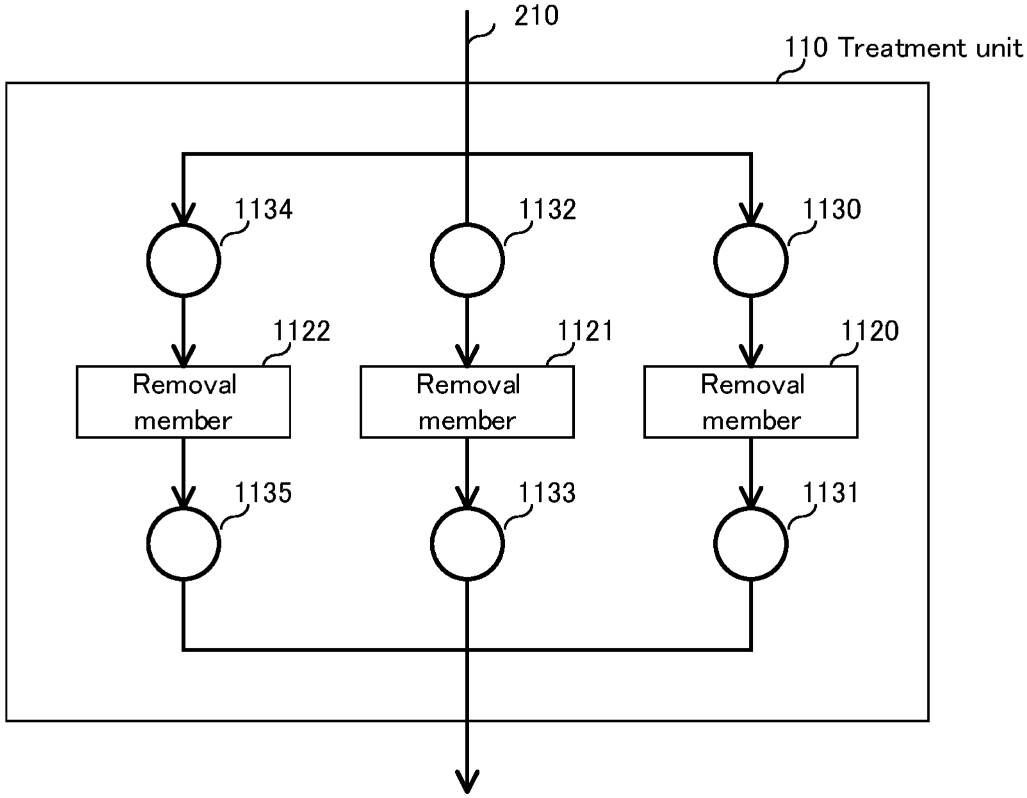
FIG. 7 is a diagram showing a second example of the internal configuration of the treatment unit shown in FIG. 1.

FIG. 7 is a diagram showing a second example of the internal configuration of treatment unit 110 shown in FIG. 1. In the example shown in FIG. 7, treatment unit 110 shown in FIG. 1 includes three removal members 1120, 1121, and 1122, and six valves 1130 to 1135. Removal member 1120 and valves 1130 and 1131 are connected in a series in the order of valve 1130, removal member 1120, and valve 1131 from upstream, removal member 1121 and valves 1132 and 1133 are connected in a series in the order of valve 1132, removal member 1121, and valve 1133 from upstream, and removal member 1122 and valves 1134 and 1135 are connected in a series in the order of valve 1134, removal member 1122, and valve 1135 from upstream, these three series being connected with each other in parallel. Valves 1130 to 1135 are sixth valves that are controlled such that ultrapure water flowing in from distribution pipe 210 flows into any one of the three removal members 1120, 1121, and 1122. Flow path controller 520 controls the opening and closing of valves 1130 to 1135 based on the result of the comparison between the first amount and the second amount in comparator 510. At this time, when the first amount is smaller than the second amount but approaches the second amount (for example, when the first amount is a value obtained by subtracting a predetermined value from the second amount), flow path controller 520 controls the opening and closing of valves 1130 to 1135 so as to switch the removal member through which the ultrapure water flows to another removal member. Further, a value smaller than the second amount is set in advance as a permissible amount, and when the first amount becomes the permissible amount, flow path controller 520 may control the opening and closing of valves 1130 to 1135 so as to switch the removal member through which the ultrapure water flows to another removal member.

Figure 8:
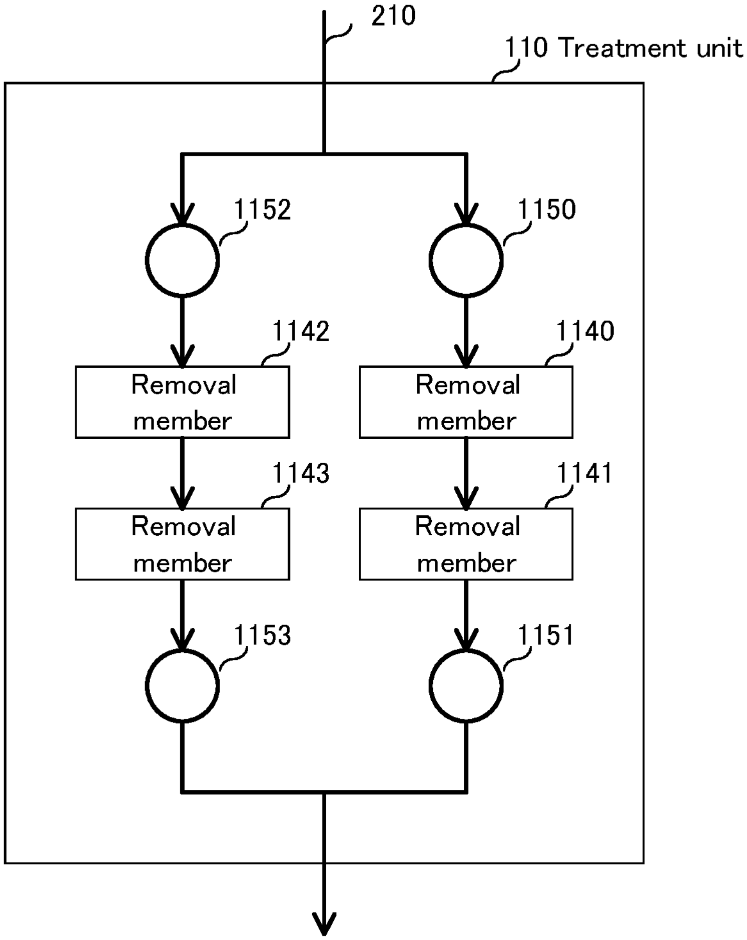
FIG. 8 is a diagram showing a third example of the internal configuration of the treatment unit shown in FIG. 1.

FIG. 8 is a diagram showing a third example of the internal configuration of treatment unit 110 shown in FIG. 1. In the example shown in FIG. 8, treatment unit 110 shown in FIG. 1 includes four removal members 1140, 1141, 1142, and 1143 and four valves 1150 to 1153. Removal members 1140 and 1141 and valves 1150 and 1151 are connected in a series in the order of valve 1150, removal member 1140, removal member 1141, and valve 1151 from upstream, and removal members 1142 and 1143 and valves 1152 and 1153 are connected in a series in the order of valve 1152, removal member 1142, removal member 1143, and valve 1153 from upstream, these two series being connected with each other in parallel. Valves 1150 to 1153 are sixth valves that are controlled so that ultrapure water flowing in from distribution pipe 210 flows into one or the other of the two series. Flow path controller 520 controls the opening and closing of valves 1150 to 1153 based on the result of the comparison between the first amount and the second amount in comparator 510. At this time, when the first amount is smaller than the second amount but approaches the second amount (for example, when the first amount is a value obtained by subtracting a predetermined value from the second amount), flow path controller 520 controls the opening and closing of valves 1150 to 1153 so as to switch the series in which the ultrapure water flows to the other series. Further, a value smaller than the second amount is set in advance as a permissible amount, and when the first amount becomes the permissible amount, flow path controller 520 may control the opening and closing of valves 1150 to 1153 so as to switch the series in which the ultrapure water flows to the other series. Further, a valve which is similarly controlled by flow path controller 520 may be provided between removal member 1140 and removal member 1141 or between removal member 1142 and removal member 1143.

Thus, treatment unit 110 includes a plurality of removal members, and these removal members have a redundant configuration. Flow path controller 520 uses the sixth valves to switch the removal member to which the ultrapure water flows depending on the amount of impurities contained in the ultrapure water flowing through the removal member. Thus, it is possible to perform continuous supply of ultrapure water to cleaning apparatus 120. A pump may also be provided in treatment unit 110, and the ultrapure water may be supplied using the pump. The installation position of the pump is, for example, upstream from the removal member. The specific redundant configuration of the removal members in treatment unit 110 is not limited to those shown in FIGS. 6 to 8. In addition, the above description does not exclude treatment unit 110 that comprises only one removal member from the present invention. Note that each of removal members 1100, 1101, 1120 to 1122, and 1140 to 1143 shown in FIGS. 6 to 8 is, for example, an ion exchanger, a microfiltration membrane (MF), an ultrafiltration membrane (UF), or the like that has been described above as a member to be placed in treatment unit 110.

As described above, in this embodiment, upon the start-up of ultrapure water production facility 100, ultrapure water is supplied from ultrapure water production facility 100 to cleaning apparatus 120 after passing through treatment unit 110. The path of the ultrapure water supplied to cleaning apparatus 120 is switched to a path that does not pass through treatment unit 110 based on the result of comparison of the amount (concentration) of impurities of the ultrapure water from ultrapure water production facility 100 in the distribution pipe supplied to cleaning apparatus 120 without passing by way of treatment unit 110 with the amount (concentration) of impurities of ultrapure water that has passed by way of treatment unit 110. By means of this method, it is possible to start up ultrapure water production facility 100 at an early stage, and the operation of the ion exchange filter constituting treatment unit 110 is optimized. As a result, the system for supplying ultrapure water can be efficiently utilized.

Second Embodiment

Figure 9:
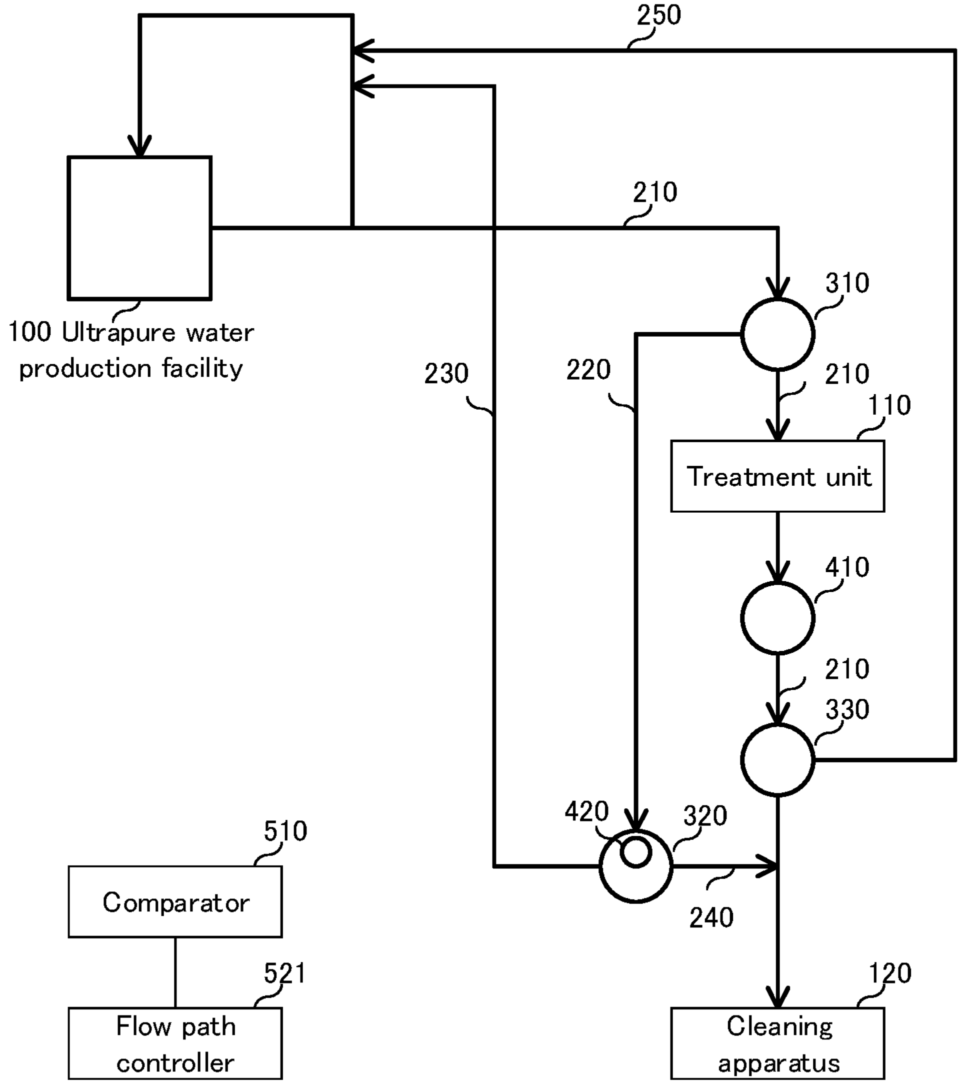
FIG. 9 is a diagram showing a second embodiment of the ultrapure water supply system of the present invention.

FIG. 9 is a diagram showing a second embodiment of the ultrapure water supply system of the present invention. As shown in FIG. 9, the ultrapure water supply system in this embodiment has treatment unit 110, distribution pipes 210, 220, 230, 240, and 250, water amount controllers 310, 320, and 330, measuring unit 410, comparator 510, and flow path controller 521. Treatment unit 110, distribution pipes 210, 220, 230, and 240, water amount controllers 310 and 320, measuring units 410 and 420, and comparator 510 are each the same as those in the first embodiment.

Distribution pipe 250 is a fifth distribution pipe that supplies ultrapure water to ultrapure water production facility 100 and that branches from distribution pipe 210 at a third branch portion between the point at which measuring unit 410 is installed and the confluence point between distribution pipe 240 and distribution pipe 210. Distribution pipe 250 may also serve for conducting ultrapure water from distribution pipe 210 to a drain tank or a recovery tank (not shown). Water amount controller 330 is a third water amount controller provided at the third branch portion.

Figure 10:
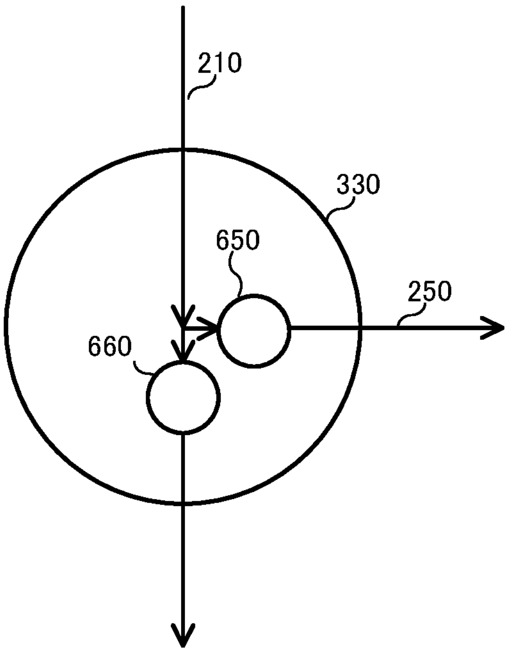
FIG. 10 is a diagram showing an example of the internal configuration of the third water amount controller shown in FIG. 9.

FIG. 10 is a diagram showing an example of the internal configuration of water amount controller 330 shown in FIG. 9. As shown in FIG. 10, water amount controller 330 shown in FIG. 9 has valve 650 and valve 660. Valve 650 is a fifth valve (shutoff valve) for adjusting the amount of water flowing into distribution pipe 250. Valve 660 is a sixth valve (shutoff valve) for adjusting the amount of water flowing to cleaning apparatus 120. For example, after removing treatment unit 110 from distribution pipe 210, flow path controller 521 places valves 610 and 650 in the open state and places valve 660 in the closed state in order to blow out distribution pipe 210. In this way, after removing treatment unit 110, ultrapure water from ultrapure water production facility 100 flows through distribution pipes 210, 220, and 240 to cleaning apparatus 120 and returns to ultrapure water production facility 100 via distribution pipes 210 and 250. Further, in order to blow out distribution pipe 230, flow path controller 521 places valves 620 and 630 in the open state. Flow path controller 521 not only controls the open and closed states of valves 610, 620, 630, 640, 650, and 660 to a fully open or fully closed state, but also controls the open and closed states to realize the required amount of flow of ultrapure water for each of distribution pipes 210, 220, 230, 240, and 250.

Water amount controllers 310, 320, and 330, measuring units 410 and 420, valves 610, 620, 630, 640, 650, and 660, comparator 510, and flow path controller 521 described above constitute a control device.

As described above, in this embodiment, at the start-up of ultrapure water production facility 100, the ultrapure water is supplied from ultrapure water production facility 100 to cleaning apparatus 120 after passing through treatment unit 110. Based on the result of comparison of the amount (concentration) of impurities of ultrapure water in the distribution pipe that is supplied from ultrapure water production facility 100 to cleaning apparatus 120 without passing through treatment unit 110 with the amount (concentration) of impurities of ultrapure water that has passed through treatment unit 110, the path of the ultrapure water supplied to cleaning apparatus 120 is switched to a path that does not pass through treatment unit 110. By means of this method, ultrapure water production facility 100 can be started up at an early stage, and the operation of ion exchangers, microfiltration membranes (MF), ultrafiltration membranes (UF), and the like constituting treatment unit 110 can be optimized. As a result, the system for supplying ultrapure water can be efficiently utilized. Furthermore, distribution pipe 250 is provided for returning the ultrapure water that flows through distribution pipe 210 to a recovery tank or a drainage tank. Thus, for example, when treatment unit 110 is removed from distribution pipe 210, the flow of the ultrapure water can be maintained to blow out distribution pipe 210. Then, for example, when the implementation of maintenance in ultrapure water production facility 100 is performed or when the deterioration of the ultrapure water quality occurs, treatment unit 110 can again be installed in distribution pipe 210 and the ultrapure water can be supplied from ultrapure water production facility 100 by way of distribution pipe 210 in which treatment unit 110 is installed. In this way, the start-up time can be shortened and the ultrapure water can be supplied without stopping the operation of cleaning apparatus 120.

Although described above by allocating each function (processing) to each component, these assignments are not limited to those described above. In addition, as for the configuration of the components, the above-described embodiments are merely examples and the present invention is not limited thereto. Further, the present invention may be a combination of the embodiments. The control of the open and closed states of valves 610, 620, 630, 640, 650, and 660 can also conceivably be performed by a manager that manages the system in addition to the control performed by flow path controllers 520 and 521 as described above.

The processing performed by measuring units 410 and 420, comparator 510, and flow path controllers 520 and 521 described above may be performed by logic circuits each manufactured according to their purpose. Further, a computer program (hereinafter, referred to as a "program") in which the processing contents are described as procedures may be recorded on a recording medium that can be read by control devices provided in measuring units 410 and 420, comparator 510, and flow path controllers 520 and 521, and the program recorded on the recording medium may be read into the control devices and executed. The recording medium that can be read by the control device refers to a transferable recording medium such as a floppy (registered trademark) disk, a magnetic-optical disk, a DVD (Digital Versatile Disc), a CD (Compact Disc), a Blu-ray (registered trademark) Disc, a USB (Universal Serial Bus) memory, or the like, or a memory such as a ROM (Read Only Memory), a RAM (Random Access Memory), or an HDD (Hard Disc Drive) incorporated in the control device. The program recorded on the recording medium is read by a CPU provided in the control device, and the same processing as described above is performed under the control of the CPU. Here, the CPU operates as a computer that executes a program read from a recording medium on which a program is recorded.

While the present invention has been described with reference to the embodiments, the present invention is not limited to the above embodiments. Various changes within the scope of the present invention that can be understood by those skilled in the art can be made in the configuration and details of the present invention.

This application claims priority based on JP 2020-154530, filed Sep. 15, 2020, and incorporates all of its disclosure herein.

What is claimed is:

1. An ultrapure water supply system, comprising:

a treatment unit installed in a first distribution pipe that treats ultrapure water to produce treated ultrapure water;

the first distribution pipe configured to receive ultrapure water from a source of ultrapure water and convey the ultrapure water to the treatment unit, and conduct the treated ultrapure water from the treatment unit to a cleaning apparatus;

a second distribution pipe that branches from the first distribution pipe between the source of ultrapure water and the treatment unit and that conducts the ultrapure water toward the cleaning apparatus;

a first water amount controller that is provided at a first branch portion at which the second distribution pipe branches from the first distribution pipe and controls flow of the ultrapure water from the first distribution pipe to the treatment unit to thereby control flow of the treated ultrapure water from the treatment unit to the cleaning apparatus;

a second water amount controller that controls the ultrapure water that flows from the second distribution pipe to the cleaning apparatus;

a first measuring unit installed in the first distribution pipe that measures a first amount of impurities contained in treated ultrapure water;

a second measuring unit installed in the second distribution pipe that measures a second amount of impurities contained in the ultrapure water;

a comparator that compares the first amount measured by the first measuring unit with the second amount measured by the second measuring unit;

a flow path controller that controls the first water amount controller and the second water amount controller to select between delivering either the ultrapure water in the first distribution pipe to the cleaning apparatus or the ultrapure water in the second distribution pipe to the cleaning apparatus based on the result of comparison in the comparator;

a second branch portion that branches the second distribution pipe into a third distribution pipe for returning ultrapure water from the second distribution pipe toward the source of ultrapure water and a fourth distribution pipe for conducting ultrapure water from the second distribution pipe to the cleaning apparatus, wherein the second water amount controller is provided at the second branch portion;

the first and the fourth distribution pipes intersect at a confluence point;

a first valve having an inlet connected to the first distribution pipe between the first measuring unit and the confluence point;

a fifth distribution pipe connected to an outlet of the first valve that conducts treated ultrapure water to the source of ultrapure water; and the first valve adjusting the amount of water flowing from the first distribution pipe to the fifth distribution pipe.

2. The ultrapure water supply system according to claim 1, wherein a second valve for adjusting the amount of water flowing from the first distribution pipe to the treatment unit, and a third valve for adjusting the amount of water flowing from the first distribution pipe to the second distribution pipe, a fourth valve for adjusting the amount of water flowing from the second distribution pipe to the third distribution pipe, and a fifth valve for adjusting the amount of water flowing from the second distribution pipe to the fourth distribution pipe, and the flow path controller controls the opening and closing of each of the second valve, the third valve, the fourth valve, and the fifth valve.

3. The ultrapure water supply system according to claim 2, wherein the flow path controller places the second valve, the third valve, and the fourth valve in the open state and the fifth valve in the closed state when the first amount is less than the second amount and the difference between the first amount and the second amount is equal to or greater than a predetermined value, and otherwise places the second valve and the fourth valve in the closed state and the third valve and the fifth valve in the open state.

4. The ultrapure water supply system according to claim 1, wherein the first measuring unit and the second measuring unit include an ion exchanger for capturing the impurities.

5. The ultrapure water supply system according to claim 4, wherein the ion exchanger is a monolithic ion exchanger.

6. The ultrapure water supply system according to claim 1, wherein the first measuring unit and the second measuring unit include a filtration membrane and a centrifugal filtration mechanism capable of capturing fine particles having a diameter of 10 nm or more as the impurities.

7. The ultrapure water supply system according to claim 1, wherein the treatment unit, comprises:

a plurality of removal members connected to each other in parallel that remove the impurities from the ultrapure water flowing into the treatment unit; and sixth valves that cause the ultrapure water to flow to any one removal member of the plurality of removal members.

8. The ultrapure water supply system according to claim 7, wherein the flow path controller, based on the result of comparison between the first amount and the second amount in the comparator, controls the sixth valves so as to switch the removal member through which the ultrapure water flows.

* * * * *